Oct. 30, 1951
A. McD. HESS
2,573,441
PLEATING
Filed Feb. 27, 1946
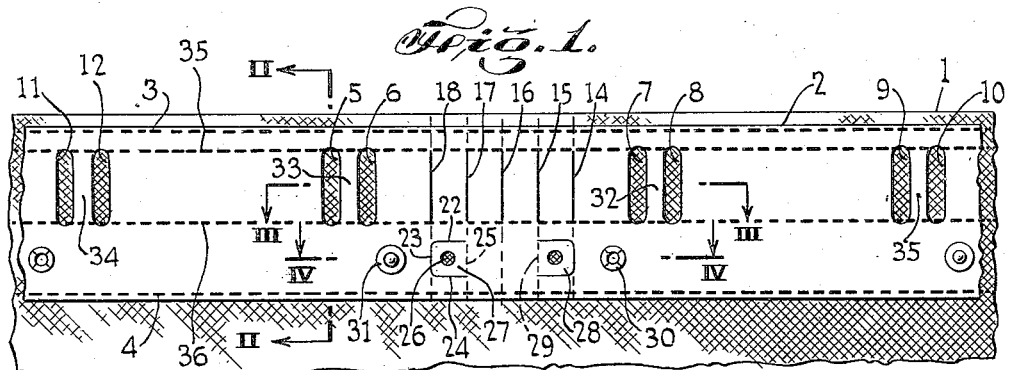
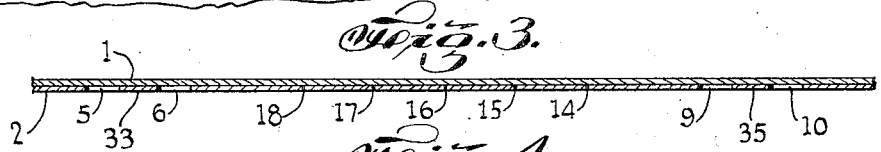
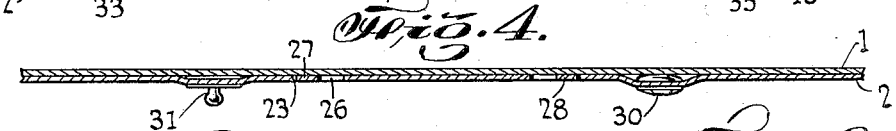
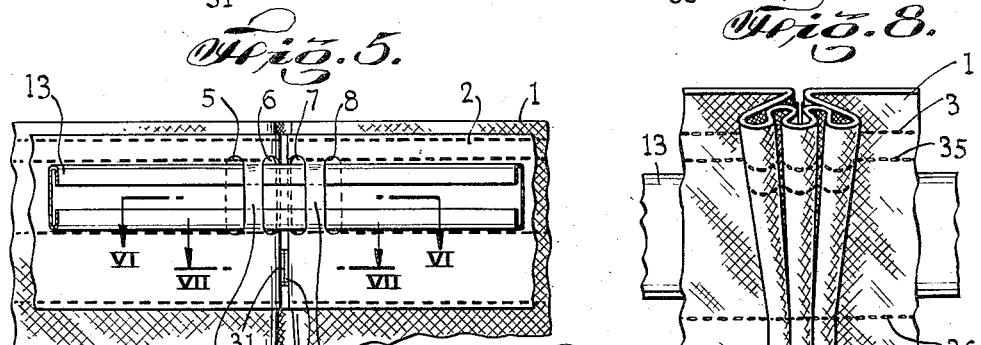
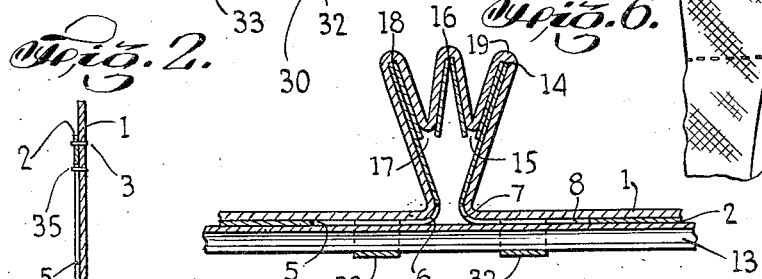
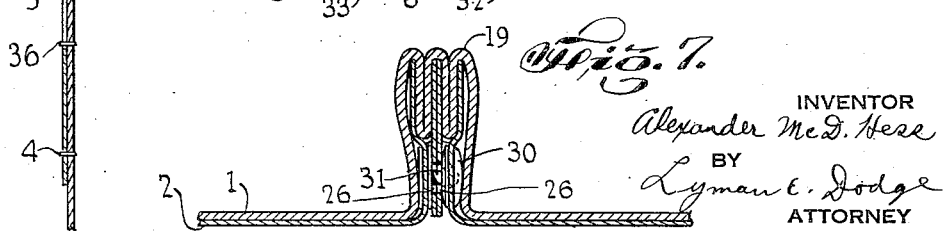
INVENTOR
Alexander McD. Hess
BY
Lyman E. Dodge
ATTORNEY Patented Oct. 30, 1951

2,573,441

UNITED STATES PATENT OFFICE 2,573,441

PLEATING

Alexander McD. Hess, New York, N. Y.

Application February 27, 1946, Serial No. 650,637

7 Claims. (Cl. 160—84)

This invention relates to pleating draperies such as those used at windows and the like.

A principal object of this invention is to provide a means whereby pleats in draperies may be conveniently uniformly formed and maintained in shape after being formed.

A further object of the invention is to provide means of the type specified whereby pleats in draperies may be accurately positioned.

Other objects and advantages will appear as the description of the particular physical embodiment selected to illustrate the invention progresses and the novel features will be particularly pointed out in the appended claims.

In describing the invention in detail and the particular physical embodiment selected to illustrate the invention, reference will be had to the accompanying drawings and the several views thereon, in which like characters of reference designate like parts throughout the several views, and in which:

Figure 1 is an elevational view of a pleating means embodying my invention shown in connection with a fragment of a drapery; Fig. 2 is a cross-sectional view of the device as shown by Fig. 1 on the plane indicated by the line II—II viewed in the direction of the arrows at the ends of the line; Fig. 3 is a cross-sectional view of the device as shown by Fig. 1 on the plane indicated by the line III—III viewed in the direction of the arrows at the ends of the line; Fig. 4 is a cross-sectional view of the device as shown by Fig. 1 on the plane indicated by the line IV—IV viewed in the direction of the arrows at the ends of the line; Fig. 5 is a somewhat enlarged elevational view of a fragment of the device as shown by Fig. 1 assembled on a supporting rod; Fig. 6 is a cross-sectional view of the device as shown by Fig. 5 on the plane indicated by the line VI—VI, viewed in the direction of the arrows at the ends of the line; Fig. 7 is a cross-sectional view of the device as shown by Fig. 5 on the plane indicated by the line VII—VII, viewed in the direction of the arrows at the ends of the line; and Fig. 8 is a somewhat perspective view of the front or reverse side of the device of Fig. 1 after being assembled, as shown in Fig. 5.

In Fig. 1 a fragment of a drape 1 is shown. This drape is most generally of textile material and is generally supported at or near the top and allowed to hang freely from the support and is preferably pleated. My invention provides a means for forming the pleats and assisting in the support of the drape.

My particular means, in a preferred form, is designated as a whole by 2 and may be called a pleating tape. It may be made of any appropriate or suitable material in the form of a ribbon. I prefer a rather stiff material, such as buckram, but I do not intend to confine the scope of my invention to this particular material.

The tape, or ribbon-like strip, 2 is attached to the drape 1 in any suitable or appropriate manner. A suitable and appropriate manner would be by means of sewing along one or more lines as at 3 and 4 and 35 and 36.

As a suitable construction for supporting the drape, I pre-form the tape with cut-out portions of such size and of such location as will afford openings for a supporting rod. In the particular preferred form shown in Fig. 1, I form at a plurality of positions, suitably spaced along the length of the tape, openings such as 5, 6, 7, 8, 9, 10, 11 and 12. The openings 5 and 6 and 7 and 8 form a co-operating set and I prefer this particular number and position of openings. The entire length of the tape would be pre-formed with sets of openings such as 5 and 6 and 7 and 8. The sets would be spaced apart a distance which would be considered esthetically satisfactory with reference to the final pleats of the drape.

In Fig. 5 I have shown the drape and tape of Fig. 1 applied to a supporting rod 13. If this supporting rod 13 is introduced from the right, as viewed in Fig. 5, the left hand end of the rod 13 would be first introduced in the opening 8. It would then emerge from opening 7. Then it would be introduced into opening 6 and emerge from opening 5. This same procedure would be followed along the entire line of the tape for the full width of the drape 1.

Although for the purpose of supporting the tape and so the drape on a rod, I have formed openings such as 5 to 12 inclusive, nevertheless, it must be understood that these openings, viewed from one standpoint, are merely a means for forming straps such as 32, 33, 34 and 35 so that I do not intend to exclude by my preferred showing, a tape with straps thereon either integrally or non-integrally formed and secured thereto in any appropriate manner.

By reference to Fig. 6, the effect upon the drape and the tape of assembling the drape and tape upon the rod 13 is shown. The material of the tape and drape is gathered or bunched substantially symmetrically about the center line between openings 6 and 7.

In order to give the gathered or bunched material an appropriate form, that is, a pleated form, the tape between openings 6 and 7, as best shown in Fig. 1, has its uniformity disturbed in some manner at definite lines transverse to the length of the tape. This change in uniformity may be accomplished in various ways, as by a transverse scoring or line of perforations or slitting or even by a printed line. I prefer to slit the material of the tape, and desire to also indicate scoring, perforating or printing by the term slit, but I prefer to have the slit extend entirely through the material of the tape. In Fig.1, my preferred form, I show slits 14, 14, 16, 17 and 18. These slits do not extend the entire distance from one edge of the tape to the other edge of the tape. Preferably the slits 14 to 18 inclusive would not be in length more than one-half the width of the tape. In the case of printed lines, this would serve to assist a person to get the pleats straight.

Disturbing the uniformity of the tape at various points between the openings 6 and 7 favors the forming of the bunched material, illustrated in Fig. 6, into a plurality of identical pleats. The slit 14 would define the apex 19 of one pleat; 15 the inner apex of another pleat; 16 the outer apex of the middle pleat; 17 the inner apex of a pleat; and 18 the outer apex of a third pleat. By forming the slits 14 to 18 between the openings 6 and 7 and having the central slit 16 precisely midway between openings 6 and 7 and spacing the slits at equal distances apart, a plurality of uniform, well-defined pleats will be formed between the opening 6 and the opening 7, as well shown in Fig. 6. The disturbance of the uniformity of the pleat, that is, my preferred slits, well define the apexes of the pleats and the natural stiffness of the material of the tape serves to maintain the sides of the pleat in proper position to form uniform pleats.

It is to be observed that in my preferred form of tape the sides 29 and 25 of the tabs 27 and 28 are formed in line with the slits 15 and 17 respectively. This is the most desirable construction because thereby the traction exerted by the tabs is practically directly against the apexes of the pleats which are formed at the lines 15 and 17, and thus serve most thoroughly to hold the pleats in the formed condition.

Pleats of uniform structure and position may well be formed by the construction hereinbefore described, but a disturbance of the drape might well disturb the pleats so that I have provided means for maintaining the pleats after once being formed.

My means for maintaining the pleats is to provide apertured-retaining tabs at each pleat location together with means for holding the apertured tabs to the main unpleated body of the drape.

My preferred method of providing tabs is to form the tabs directly in place on the tape, that is, referring to Fig. 1, I make cuts or slits entirely through the material of the tape along three sides of a square or oblong as at 22, 23 and 24, severing the material of the tape but leaving the side 25 firmly attached. I also form a through orifice 26 somewhat in the center of the tab 27. I form a similar tab, 28, left connected to the material of the tape, along the line 29. When these tabs have been formed they can be raised to a position at right angles to the tape. In order to hold these tabs to the main unpleated body of the tape, I provide co-operating fasteners one to the right of the tabs and one to the left of the tabs as 30 and 31. These fasteners are preferably of the male and female type and are attached in any suitable or appropriate manner to the tape 2. The male, or projecting member, is of a length such that it will project through the tabs 27 and 28, when they are placed at right angles to the tape 2, and co-operate with the socket or female member 30. This is well shown in Fig. 7.

The provision of the tabs 27 and 28 and the snap fasteners 30 and 31 affords a means whereby the pleats, after being formed, as shown in Fig. 6, will be maintained in form.

It is to be understood that although I have shown my tabs 27 and 28 as being formed integrally with the tape 2, I do not wish to be understood as excluding the use of tabs of a somewhat similar form pre-formed and then attached by any suitable or appropriate means to the tape 2.

Although I have illustrated my tape as forming pleats in what I consider its best form, nevertheless, it is to be understood that although I have shown five slits 14 to 18 in my tape in Fig. 1, it is within the scope of my invention to form a single pleat at a particular location. In such case, I would have the central slit 16 solely and dispense entirely with the tabs 27 ant 28, but still use the fasteners 30 and 31.

Although I have particularly described one particular physical embodiment of my invention, nevertheless I desire to have it understood that the form selected is merely illustrative and does not exhaust the possible physical embodiments of the idea of means underlying my invention.

What I claim as new and desire to secure by Letters Patent is:

1. A pleating tape provided with a plurality of straps positioned regularly along the length thereof, two adjacent straps forming a cooperating pair, the material of the tape being formed with a central slit and at least two slits on each side of the central slit, apertured tabs, one on each side of the central slit and one with its line of attachment to the tape in line with the slit closest to the central slit on its side and the other having its line of attachment with the tape in line with the closest slit to the central slit on its side, two cooperating fasteners attached to the tape, one positioned at one side of one tab remote from the other tab and the other positioned on the side of the other tab remote from the first tab, one of these fasteners being projectable through the apertures in the two tabs when the tabs are placed face to face and also projectable into the other fastener.

2. A pleating tape formed with apertured tabs and with cooperating fasteners, one on one side of one tab remote from the other tab and the other on the side of the other tab remote from the first tab, one of said fasteners being projectable through the apertures in the tabs when in operative position and interconnectable with the other fastener whereby folds in the tape centered on a line intermediate the two tabs are maintained.

3. A pleating tape provided with a plurality of paired openings positioned regularly along the length of the tape, such openings adapted for receiving a supporting rod, slits in the tape between each pair of openings comprising a central slit and supplementary slits on each side thereof, apertured tabs, one attached to the tape at one side of the central slit and the other attached at the other side of the central slit and the line of attachment of each being in line with the nearest slit on its side to the central slit, two cooperating fasteners, one positioned between a tab and a pair of said openings on one side of the central slit and the other positioned between the tab and a pair of said openings at the other side of the central slit, one of said fasteners being projectable through the apertures in the tabs when the tabs are positioned face to face and interconnectable with the other fastener whereby, when the tape is attached to a drape, three pleats may be conveniently formed centralized on the central slit and their apexes each positioned at a slit and be maintained, after being formed by the cooperating fasteners, and whereby a slit in the tape will be positioned at the apex of each pleat.

4. A pleating tape provided with straps positioned regularly along the length of the tape, such straps adapted for embracing a supporting rod, slits in the tape between each pair of straps comprising a central slit and supplementary slits on each side thereof, apertured tabs, one attached to the tape at one side of the central slit and the other attached at the other side of the central slit and the line of attachment of each being in line with the nearest slit on its side to the central slit, two cooperating fasteners, one positioned between a tab and a strap on one side of the central slit and the other positioned between the tab and the strap at the other side of the central slit, one of said fasteners projectable through the apertures in the tabs when the tabs are positioned face to face and interconnectable with the other fastener whereby, when the tape is attached to a drape, three pleats may be conveniently formed centralized on the central slit and their apexes each positioned at a slit and be mantained, after being formed by the cooperating fasteners, and whereby the line of traction of each tape will be directly to the inner apexes of the folded pleats.

5. A pleating tape formed with apertured tabs and with cooperating fasteners, one on one side of one tab remote from the other tab and the other on the side of the other tab remote from the first tab, one of said fasteners being projectable through the apertures in the tabs and interconnectable with the other fastener whereby folds in the tape centered on a line intermediate the two tabs are maintained.

6. A pleating tape formed with apertured tabs and with cooperating fasteners, one on one side of one tab remote from the other tab and the other on the side of the other tab remote from the first tab, one of said fasteners being projectable through the apertures in the tabs and interconnectable with the other fastener whereby folds in the tape centered on a line intermediate the two tabs are maintained and means for indicating the position of the apexes of the folds.

7. A pleating tape for attachment to and pleating of a curtain provided with a plurality of pairs of longitudinally spaced apertured tabs, one of each pair attached to the tape in line with a prospective inner apex of a prospective central pleat and a prospective pleat on one side thereof and the other tab of each pair attached to the tape in line with the other prospective inner apex of the same central pleat and a prospective pleat on the other side of the central pleat, cooperating fasteners attached to the tape, one positioned at the relative outer sides of the respective tabs of each pair, one of these fasteners being projectable through the apertures in the two tabs when the tabs are placed face to face and also projectable into the other fastener.

ALEXANDER McD. HESS.

REFERENCES CITED

The following references are of record in the file of this patent:

UNITED STATES PATENTS

| Number | Name | Date |
| --- | --- | --- |
| 1,958,436 | Hess | May 15, 1934 |
| 2,115,593 | Strube | Apr. 26, 1938 |
| 2,167,651 | Hess | Aug. 1, 1939 |
| 2,302,630 | Hess | Nov. 17, 1942 |